United States Patent [19]

Green

[11] 4,092,194
[45] May 30, 1978

[54] PROCESS FOR MAKING CERAMIC REFRACTORY OXIDE FIBER-REINFORCED CERAMIC TUBE

[75] Inventor: James R. Green, Laurel, Del.

[73] Assignee: E. I. Du Pont de Nemours and Company, Wilmington, Del.

[21] Appl. No.: 710,101

[22] Filed: Jul. 30, 1976

Related U.S. Application Data

[60] Division of Ser. No. 566,319, Apr. 9, 1975, Pat. No. 3,986,528, which is a continuation-in-part of Ser. No. 290,643, Sep. 20, 1972, abandoned.

[51] Int. Cl.² .......................... B01J 35/00; F16L 9/00
[52] U.S. Cl. ..................... 156/89; 138/177; 156/172; 156/175; 252/477 R; 427/376 A; 428/36; 428/325; 428/538

[58] Field of Search ............... 87/1; 57/153; 138/144, 138/141, 153, 177, 172, 123, 178; 106/65; 428/364, 373, 374, 376, 378, 384, 389, 538, 539, 432, 36, 135, 210, 268, 273, 325; 427/375, 376, 215; 252/477 R; 60/274; 210/509; 93/288 F; 156/89, 173, 428, 175, 172

[56] References Cited

U.S. PATENT DOCUMENTS

| | | | |
|---|---|---|---|
| 3,117,055 | 1/1964 | Guandique et al. | 428/290 |
| 3,189,563 | 6/1965 | Hauel | 252/477 R |
| 3,495,950 | 2/1970 | Barber et al. | 252/477 R |
| 3,793,041 | 2/1974 | Sowman | 210/509 |
| 3,828,934 | 8/1974 | Green et al. | 210/497.1 |
| 3,843,561 | 10/1974 | Sobel | 252/477 R |

*Primary Examiner*—William A. Powell
*Assistant Examiner*—Michael W. Ball

[57] ABSTRACT

A reticulated tube of reinforced ceramic fibers is provided as a catalyst carrier for use in the catalytic conversion of internal combustion engine exhaust fumes. The tube is comprised of multiple layers of continuous yarn of selected ceramic fibers which can be bonded, if desired, with a substantially nonporous binder having selected properties and contained in a refractory oxide matrix having selected properties.

6 Claims, 5 Drawing Figures

PROCESS FOR MAKING CERAMIC REFRACTORY OXIDE FIBER-REINFORCED CERAMIC TUBE

CROSS REFERENCE TO RELATED APPLICATION

This is a division of application Ser. No. 566,319, filed Apr. 9, 1975, which is in turn, now U.S. Pat. No. 3,986,528 a continuation-in-part of application, Ser. No. 290,643, filed Sept. 20, 1972 and now abandoned.

FIELD OF THE INVENTION

This invention relates to a catalyst carrier for fluid reactors, and more particularly, to a reticulated tube of reinforced ceramic fibers suitable as a catalyst support for the catalytic conversion of internal combustion engine exhaust fumes at elevated temperatures.

DESCRIPTION OF THE PRIOR ART

There have been two general approaches to making catalytic exhaust convertors for automobiles. One has involved the use of a loose bed of ceramic pellets as a carrier for the catalyst, and the other has involved the use of rigid ceramic elements as the catalyst carrier. The bed of ceramic pellets has the great disadvantage of attrition of the pellets due to self-abrasion so that the bed has to be replaced at frequent intervals, while the use of rigid ceramic carriers has had the disadvantage of inadequate resistance to theremal shock and to mechanical shock.

SUMMARY OF THE INVENTION

A ceramic carrier that overcomes the foregoing disadvantages has now been found. The ceramic carrier of this invention is a reticulated tube of reinforced ceramic fibers which comprises:

1. Multiple layers of continuous yarn wound in helical coils to form the walls of the tube. The yarn is wound in a spaced criss-crossed fashion to form a multitude of channels having quadrilateral-shaped cross-sections extending through the walls of the tube and is comprised of ceramic fiber having a "softening point" above about 750° C. The yarn is at least about 20% $Al_2O_3$ by weight and comprises from about 20% to about 85% of the weight of the tube.

2. A fused, substantially nonporous ceramic binder having a "softening point" above about 750° C. The binder secures adjacent fibers of the yarn to one another and comprises between about 0% and about 40% of the weight of the tube.

3. A refractory oxide matrix having a "softening point" above about 1000° C. and a porosity of between about 20 and 70%. The matrix is affixed and positioned to at least partially surround the ceramic fibers and the ceramic binder, when present, but not to substantially close the channels, and comprises between about 15% and about 80% of the weight of the tube.

The tubes have a compressive strength of at least about 30 psi, and preferably at least about 60 psi which can be as high as 800 psi, particularly for automotive purposes. In the applications such as, for example, in treatment of stack gas, where the tube is under no load, such compressive strengths are not required.

By the term "ceramic" is meant a body of crystalline or partly crystalline structure, or of glass, which body is produced from essentially inorganic, nonmetallic substances, generally oxides, and either is formed from a molten mass which solidifies on cooling, or is formed and simultaneously or subsequently subjected to heat to drive off any chemically or mechanically bound water by the action of heat. The term "ceramic" is intended to include refractory oxides; that is, a composition of one or more oxides that has a melting point of at least 1000° C.

The phrase "softening point" is used herein to mean both the softening point of a glass (i.e., a non-crystalline ceramic material) and the melting point of a crystalline ceramic material (e.g., $\alpha$-alumina, mullite, etc.).

Another embodiment of this invention is a process for the preparation of a fiber-reinforced ceramic tube with fluid permeable walls comprising the steps of:

A. plying separate yarns of
  1. a refractory oxide fiber having a yarn sag temperature above about 1000° C. or a fiber of a precursor of the refractory oxide, and
  2. a ceramic binder fiber having a "softening point" above about 750° C. and up to about 1300° C. but at least 50° C. below the sag temperature of a yarn of refractory oxide fiber, B. winding the plied yarn on a tubular core in multiple layers of spaced helical coils in a criss-cross fashion to form a tube of yarn having a multitude of channels of quadrilateral-shaped cross-section extending through the walls of the tube of yarn, C. firing the tube of yarn for a time and temperature sufficient to
  1. convert any precursor fibers present to refractory oxide fibers and
  2. soften the binder fiber to such an extent that it at least partially flows around the refractory oxide fibers to bind adjacent refractory oxide fibers upon cooling, and D. placing a coating composition on the bonded structure and firing to form a refractory oxide matrix.

Another process comprises the steps of:

I. winding a yarn of refractory oxide fibers or refractory oxide precursor fibers or both on a tubular core in multiple layers of spaced helical coils in a criss-cross fashion to form a tube of yarn having a multitude of channels of quadrilateral-shaped cross-section extending through the walls of the tube of yarn, II. firing the tube of yarn for a time and temperature sufficient to convert any precursor fibers to refractory oxide fibers, III. placing a coating composition on the wound tube and firing to form a refractory oxide matrix.

DESCRIPTION OF THE INVENTION

Figure 1:
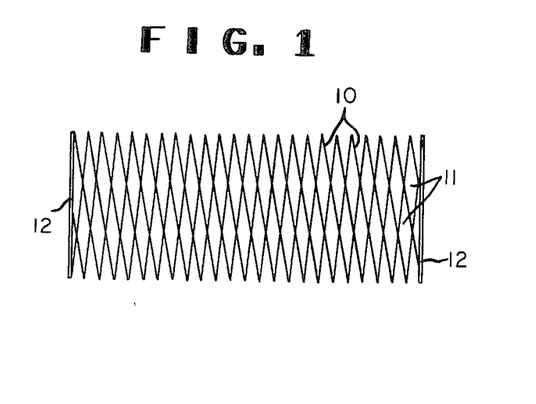
FIG. 1 is a longitudinal schematic view of a reticulated tube of reinforced ceramic fibers of this invention.

FIG. 1 depicts a reticulated tube of this invention and shows the criss-cross configuration of yarn 10 and channels 11 formed by spacing the yarns. A protective coating 12 is shown on the ends of the tube.

Figure 5:
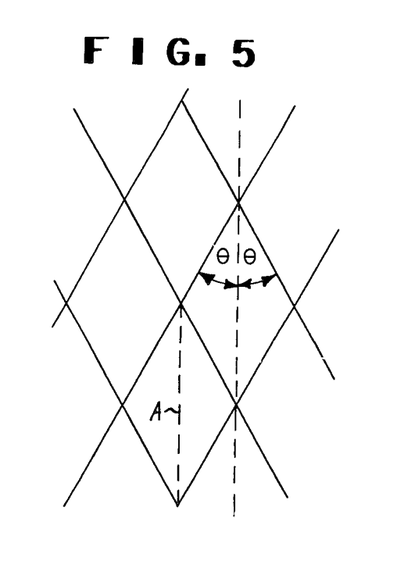
FIG. 5 is an enlarged view of a portion of FIG. 1.

The yarn, made of ceramic fibers or fibers of a precursor of the ceramic, is wound on a bobbin, for example, from left to right at a given winding angle, $\theta$, as shown in FIG. 5 in one spaced layer, and is then wound in a second spaced layer from right to left at winding angle $\theta$. This produces a diamond-shaped configuration. The distance A, shown in FIG. 5, along with angle, $\theta$, determines the size and shape of the diamonds formed by the yarn intersections. Successive layers can be built up, as desired.

Figure 2:
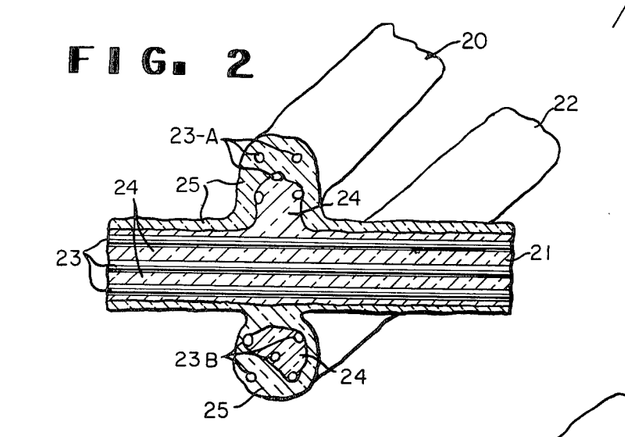
FIGS. 2 and 3 are enlarged, schematic cutaway views of a portion of two embodiments of a tube which depict the bonding at crossover points of abutting yarns.
Figure 3:
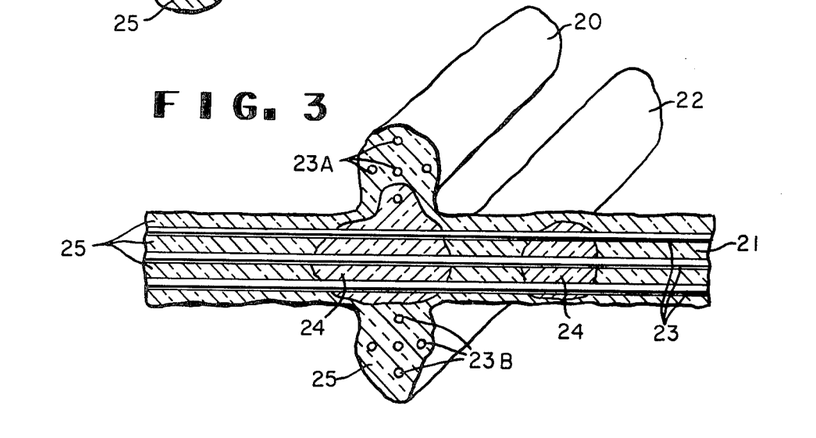

FIGS. 2 and 3 show details of the tube at crossover points of abutting portions of yarn. For purposes of illustration, the figures depict three yarns, 20, 21 and 22, which constitute three wound layers. Yarn 21 is composed of five fibers, three of which 23 are visible in the section shown. The yarn runs from left to right (and vice versa) parallel with the plane of the drawing sheet. Yarn 20 contains five ceramic fibers 23A and runs at about a right angle to yarn 21 in the layer above yarn 21. Thus, only the ends of fibers 23A are shown. Yarn 22 contains five ceramic fibers 23B and runs at about a right angle to yarn 21 in the layer below yarn 21. Thus, only the ends of fibers 23B are shown.

After the yarn is wound, a binder and a matrix or only a matrix composition is applied to the yarn (unless already present, as described below) and the structure is fired to promote bonding between fibers within a yarn and between the yarns. If the firing is carried out at a relatively high temperature the binder melts and flows to substantially surround most of the fibers within a yarn. This effect is seen in FIG. 2 where binder 24 is depicted as surrounding fibers 23 in yarn 21. Binder 24 is also depicted as surrounding almost all of the fibers 23B in yarn 22 (it is understood that only the end view is shown and that the binder extends throughout the yarn). Binder 24 is also depicted as melting to such an extent that it binds yarns 20 and 21. The refractory oxide matrix is shown as 25.

On the other hand, if heating is carried out at a lower temperature, i.e., one closer to the softening, or sintering, point of the binder, only partial flow of the binder results. This is shown in FIG. 3 by the discrete lumps or globs of binder 24 which bond the fibers. The matrix is depicted in FIG. 3 as 25. It is understood that the yarns in FIG. 3 may contain non-fused binder materials but these are not shown.

The Ceramic Fibers

The ceramic fibers employed herein must be sufficiently refractory so that yarns thereof do not sag or soften at temperatures below about 750° C., preferably 1000° C.

Suitable such fibers include certain glass fibers such as S glass (high tensile strength glass containing about 24–26% $Al_2O_3$), "Fiber Frax" and polycrystalline refractory oxide fibers containing more than about 20% $Al_2O_3$ by weight such as the alumina-silica fibers of U.S. Pat. No. 3,503,765 to Blaze and the high alumina content fibers of the proper quality disclosed in U.S. Pat. Nos. 3,808,015 and 3,853,688 to Seufert and D'Ambrosio. Preferably, the fibers contain at least 70% $Al_2O_3$ by weight. Most preferably, the fibers are substantially $\alpha$-alumina. The ceramic fibers may have diameters in the range of 0.2 to about 2 mils.

Preferably, a fiber of a refractory oxide precursor is used in making the tubes. These precursor fibers are then converted to polycrystalline refractory oxide fibers by firing to remove volatile matter, change salts to oxides and crystallize the fiber.

The preparation of refractory oxide fibers and their precursors is shown in the above patents to D'Ambrosio and Seufert.

The fibers retain their discrete fibrous form in the tube and are used in the form of yarns, preferably containing 10 to 2000 or more continuous fibers. Yarns of staple fibers can be used, especially glass. Yarns are not readily made from refractory oxide staple fibers by normal methods but composite yarns consisting of short length fibers and binder or matrix can be used. Bulked, twisted, interlaced or textured yarns may be used.

The Ceramic Binder

The non-porous ceramic binder, when used, serves (1) as a processing aid to hold the yarns in the wound tube in place for application of the matrix material and/or (2) to provide additional strength and erosion resistance in the final product. The binder must be of low enough viscosity at firing temperatures to at least partially flow around the ceramic fibers but of a high enough viscosity not to flow off of the yarn structure.

Glasses or crystalline ceramic binders that soften or sinter at temperatures at least 50° C. below the sag temperature of a yarn of ceramic fibers can be used in the form of frits or, more preferably, the binder may be in the form of a fiber or a yarn. The use of a binder in yarn or fiber form affords uniform distribution of the binder through the structure, and simplifies application because use of a binder in the form of a fiber permits it to be joined with the ceramic fiber which forms the reticulated tube prior to winding on the bobbins (this is explained in greater detail below). Siliceous glasses as used herein contain from 40 to 80% $SiO_2$ and preferred siliceous glasses contain at least 20% $Al_2O_3$. More preferably, the glass contains $Al_2O_3$ and MgO in a total amount of from 25 to 40%.

It is well known that during glass forming processes a temperature range may be reached in which the glass becomes unstable with respect to one or more crystalline compounds. This can result in crystallization of some or all of the glass. Under the conditions used for preparing the products of this invention, glass fibers used as binders may crystallize, e.g., cordierite may be formed from S-glass. Thus, the bonds in the product made from certain glass fiber binders may be partially or entirely crystalline.

Less preferably, binders can also be applied as dispersions or solutions of the binder itself or a compound that is converted to a binder after the ceramic fiber is wound on the bobbin, providing the liquid medium does not alter the fibers. When the ceramic fibers employed are refractory oxide precursor fibers made from an aqueous dispersion, a nonaqueous medium should be used. The use of a silicone oil coating on refractory oxide precursor fibers provides a coating of silica after firing which can serve as a convenient binder during application of the matrix material.

The Refractory Oxide Matrix

The refractory oxide matrix is a generally porous substance as evidenced by porosities of between about 20 and 70%. The matrix at least partially surrounds the ceramic fibers and any ceramic binder that may be present. It is postulated that the matrix provides some integrity to the fiber configuration so that an adequate level of mechanical strength is provided to the reticulated tube. The matrix also provides an excellent degree of thermal shock resistance because of the inability of the porous matrix to transmit high, thermally induced mechanical stresses to the fibers. The matrix must be sufficiently refractory to withstand the intended temperature in use of the tube, i.e., the matrix should have a softening point above about 1000° C., preferably above about 1400° C. and as high as 2800° C.

The matrix is applied to the bonded or unbonded ceramic fibers in the form of a coating composition which then is fired. Although some chemical changes may occur in the matrix coating composition in addition to loss of volatile materials on firing, the reticulated tube of this invention is a mechanically bound composite structure, substantially devoid of chemical binding forces at yarn/binder/matrix interfaces.

The coating composition from which the refractory oxide matrix can be derived is generally an aqueous solution suspension, dispersion, slurry, emulsion or the like which contains particles of one or more oxides or oxide compounds, a precursor of such an oxide or oxide compound or both. The oxides or oxide compounds (e.g., mullite, spinel) have melting points of at least 1000° C., preferably at least 1600° C., and as high as 2800° C. or more.

Examples of suitable refractory oxide precursors which can be used in coating compositions include alumina hydrate, basic aluminum chloracetate, aluminum chloride, and magnesium acetate. Coating compositions containing these materials are converted in situ to a refractory oxide or mixture of oxides by firing.

Preferably, 60–90% by weight of the refractory oxide matrix is derived from particles of the oxides (or oxide compounds) in the coating composition and 10–40% by weight from particles of a refractory oxide precursor. The particles should be preferably less than about 20 microns in diameter (and more preferably less than 2 microns) to aid penetration into voids between fibers.

The composition of the coating must be such that fluxing with the binder is avoided at firing and in-use temperatures.

In general, the coating compositions can be selected from known ceramic or refractory compositions and cements with the above requirements in mind. Preferably, the coating composition should yield a refractory oxide matrix containing at least 40% by weight of alumina with the other oxides being selected from those of the metals of Group IIA and Group IVB of the Periodic Table, such as BaO, CaO, MgO, $ZrO_2$, $TiO_2$.

Preferably, the coating composition is uniformly distributed around the fibers of the yarn. The distribution is affected by the viscosity of the coating composition, the method of application, the density (or tightness of the yarn bundle), the nature of the yarn and the amount of the coating composition. The composition should have a viscosity that is low enough to permit flow and some penetration into voids in the yarn but high enough to facilitate adhesion to the yarn structure.

When the yarn contains no refractory oxide precursor fibers, the coating composition is preferably applied in an amount calculated as refractory oxide matrix of 20–50% by weight of the final structure, to the yarn before the yarn is arranged in layers, as described below, to provide uniform distribution of the coating. The coating compositions which are conveniently aqueous dispersions or solutions can be applied to the yarn in many ways such as immersion of the yarn in a bath, use of a finish roll, spraying, etc. All or part of the coating composition can also be applied, if desired, after the tube structure is prepared.

PROCEDURE

Yarn Winding

Preferably, one or more ends of yarn of ceramic fibers or fibers of a refractory oxide precursor are joined with one or more ends of a yarn of any binder fibers that may be employed — with or without twist — and wound in a criss-cross fashion on a core of the desired shape. The yarn may be wound without employing binder fiber. The winding is conveniently carried out with a conventional precision, constant tension, yarn windup machine having a constant ratio of traverse speed and bobbin angular velocity such as the Leesona T-959 windup.

A typical winding procedure would start at the left-hand edge of the bobbin at a given winding angle, $\theta$, as depicted in FIG. 5. The yarn will make an angle with a plane normal to the tube axis of $(180° - \theta)$ as measured clockwise. The second layer of yarn is wound from right to left and makes the angle $\theta$ with the above plane as measured clockwise. This affords a diamond-shaped configuration (ideally a rhombus) with an inside angle of $2\theta$ connecting diagonal A of FIG. 5 which runs in the plane normal to the tube axis around the tube circumference. The size and shape of the diamonds formed by the intersection of the yarns is defined by the winding angle, $\theta$, and by diagonal A.

Winding angles of from 3° to 52° (preferably 12° to 45°) and diagonal A's of from 0.05 to 0.7 inches (preferably 0.2 to 0.6 in.) are used. Preferably the perpendicular distance (B) between successive, parallel yarns forming opposite sides of the quadrilateral is at least 0.10 inch (B = diagonal A . sine $\theta$). These parameters are calculated for the inside surface of the tube based on measurements on the outside of the tube since $\theta$ decreases and diagonal A increases as the wall thickness increases.

For some patterns it may be necessary to wind 2 or more layers at a given B value and $\theta$ before forming the diamond or other quadrilateral. In such cases the quadrilateral will be formed from nonadjacent yarn layers.

The registration of the quadrilateral-shaped cross-sections on successive layers of yarn can be controlled to give channels that are approximately radial or channels that follow a curved path from the inside out.

In addition to winding uniform patterns, mixtures of two or more different sized channels can be provided by appropriate modification of the winding.

The winding cores include shapes that have a continuously hollow center and have cross-sections perpendicular to the core which may be circular, or non-circular (e.g., ellipses) and the like which may be tapered. Some fibers, particularly refractory oxide precursors, undergo appreciable shrinkage upon firing. Care should be taken when such fibers are fired while wound on a core to allow for this shrinkage. Some type of a collapsible winding core is recommended. The ceramic fibers can be coated with a substance that will yield a binder or a ceramic matrix before they are wound onto the core.

Firing

The firing at any stage of the process is determined by the function of that stage.

1. Conversion of precursor fibers

In one embodiment of the invention, a yarn of refractory oxide precursor fibers is used, preferably as obtained directly from the spinning machine (as-spun) to form all or part of the reticulated tube. Such a yarn requires a relatively low firing temperature (e.g., 350° to 800° C.) to remove most volatiles and develop strength. A high firing (e.g., 1300°–1500° C.) consolidates the fiber and gives it greater strength. This can be done stepwise or in one continuous slow firing.

2. Establishing bonds from binder

In one embodiment of the invention, a binder in the form of a fiber is plied with the ceramic fiber which forms the reticulated tube and a wound tube of the composite yarn is fired at a temperature relatively close to the softening or sintering point of the binder fibers to produce partial flow or sintering (as shown in FIG. 3) or at a higher temperature for more complete flow (as shown in FIG. 2). For example, wound tubes of S glass fibers (binder) and alumina fibers (ceramic fiber which forms the reticulated tube) can be fired at about 1000° C. or 1540° C., to obtain, respectively, the partially melted bond or the completely melted bond. The nature of the glass bonds will depend upon the type of glass and the firing temperatures used. It is a characteristic of the as-spun refractory oxide precursor fibers that they shrink (linearly) from 15 to 25% upon being heated to about 550° C. Glass fibers generally show no shrinkage at this temperature so that firing below the melting point of the glass causes shrinkage of the precursor and results in a "glass-rich" surface which can improve erosion resistance.

3. Conversion of coating composition to refractory oxide matrix

The tube containing the coating composition is dried and then fired to set the composition and form the matrix. Typical coating compositions will require temperatures of between about 350° C. to 900° C. to remove most volatiles and to develop crystallinity and strength in the matrix. At these temperatures, precursors in the coating composition are converted to the corresponding oxides (e.g., alumina). Under some circumstances, e.g., high precursor level in the coating composition, the firing process may produce small cracks in the ceramic coating due to shrinkage. These are "healed" by applying one or more additional applications of the coating compound to the tube, with drying and firing between coats. Such additional applications increase the resistance of the tube to sagging or distortion during high-temperature firing, especially when fired unsupported in a vertical position.

It may be desirable to fire the tube above 900° C. to further increase the strength and crystallinity of the refractory oxide matrix. The maximum temperature should be less than 1200° C. if the tube contains more than ca. 15% silica (in fibers or matrix) because the silica in the fibers or in the matrix may start to crystallize to cristobalite at 1200° C. Excess cristobalite formation is undesirable since cristobalite undergoes a volume change at 200° to 270° C. which contributes to poor thermal shock resistance. The finished articles should contain no more than 15% cristobalite by weight and preferably less than 5%.

Optionally, additional coating composition can be added to the above high-fired tube in an amount sufficient to provide a refractory oxide matrix comprising 5–25% of the ultimate tube weight after the tube is heated at a moderate temperature (ca. 900° C.). Such tubes are good substrates for catalysts.

A preferred process uses a yarn of siliceous glass fibers comprising 61–66% $SiO_2$, 24–26% $Al_2O_3$ and 9–15% MgO. A coating composition consisting essentially of alumina and an alumina precursor is applied to the yarn in an amount sufficient to provide a refractory oxide matrix comprising 27–34% of the weight of the final tube before the yarn is wound to form the tube. The wound tube is dried at 150° C, heated to about 600° C., held for 45 minutes and cooled. Additional alumina coating composition is applied in an amount sufficient to provide refractory oxide matrix which comprises 9–12% of the weight of the final tube and the tube is dried at 150° C. The dried tube is high-fired at 900°–1150° C. in a period of 2.5 to 8 hours, held at the maximum temperature for one-quarter to 24 hours and cooled. Preferably, all of the coating composition is applied before the tube is wound to provide a final tube containing 36–46% weight of refractory oxide matrix.

The Product

Figure 4:
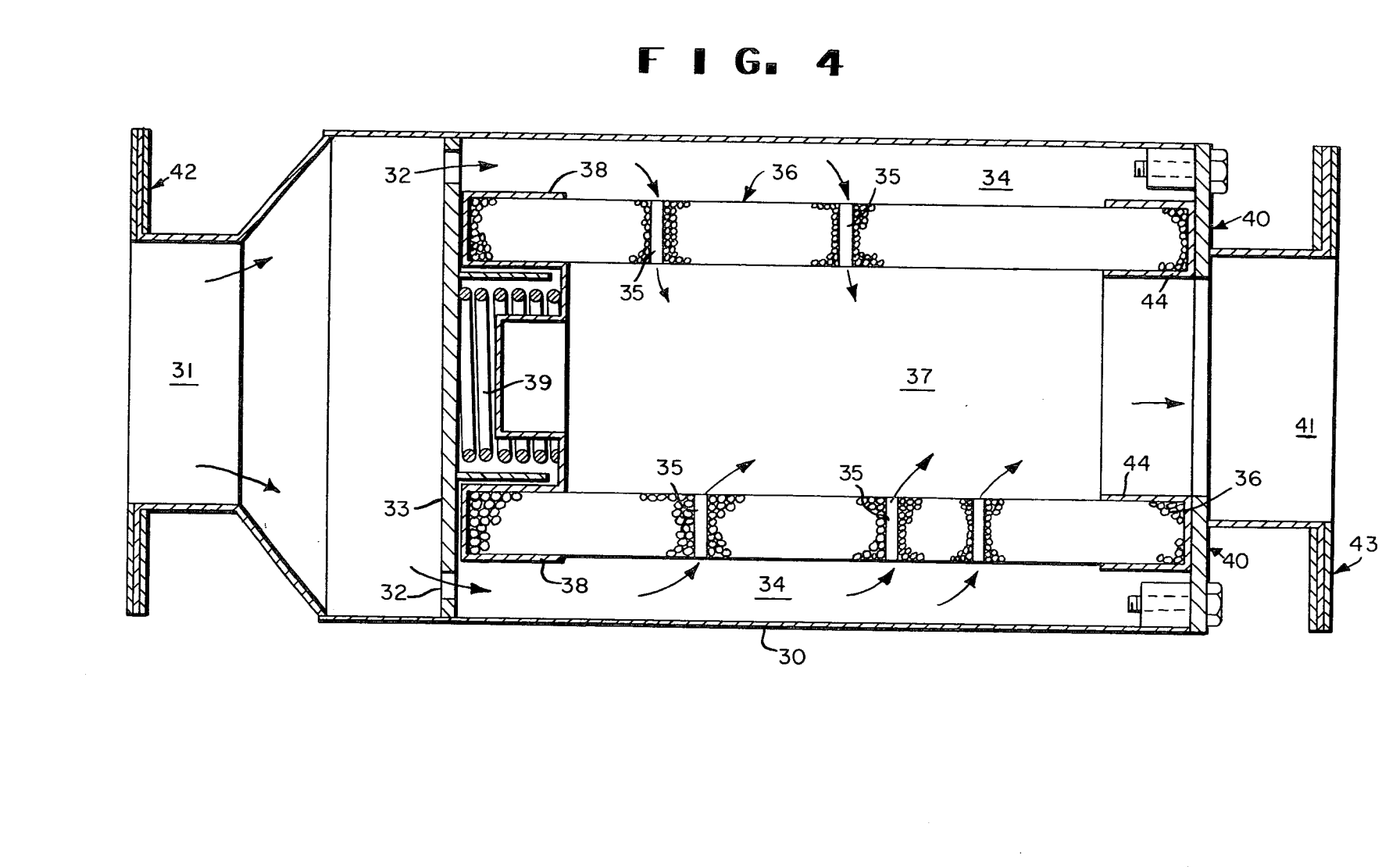
FIG. 4 is a longitudinal cross-section of an exhaust converter.

The reticulated tube products of the invention are useful as elevated temperature reactors for exhaust gases and polluting fumes where the gas flows laterally through the porous walls of the reticulated tube to contact a catalyst supported on the tube. They are surprisingly efficient as catalyst carriers, and it is postulated that this may be due to the turbulent flow through the channels in the walls of the tube and the high surface area of the structure. For example, FIG. 4 shows such a reactor comprising a cylindrical open-ended container having walls (30) with exhaust gas entering chamber (31), passing through holes or perforations (32) in wall (33) to annulus chamber (34) and thence through channels (35) in the tube of this invention (36) to the central space (37), and exiting through chamber (41). The tube is held by movable brackets (38) and (44) and pushed by spring (39) into end plate (40). Mounting means (42) and (43) are provided for attaching the reactor to an exhaust system and muffler. Although less preferred the exhaust can enter at (41) and exit at chamber (31).

A preferred class of products contains from 40 to 70% of ceramic fibers and from 30 to 60% of refractory oxide matrix with no binder. Tubes of this type, with alumina fibers and alumina matrix are extremely inert to chemicals and can be used at temperatures approaching the melting point of alumina. Such tubes do not have the higher interlaminar strength and shear strength of comparable units containing a binder.

Another preferred class of products, characterized by good erosion resistance, contains 15 to 40 weight % of a fused glass as the ceramic binder and 15 to 60 weight % of a refractory oxide matrix.

Preferred products will have $\Delta P$ of between about 1 and 100 inches of water (and more preferably less than 20 inches of water), a creep failure temperature above 1200° C. as measured under a compressive force of at least 4 psi and a thermal shock resistance such that they retain a compressive strength of at least 30 psi (and as high as 300 psi) after 5 cycles of: placing a cold unit in an oven at 950° C., heating for 5 minutes, removing from the oven and cooling in room temperature air for 5 minutes.

Catalysts

The reticulated tubes of the invention exhibit catalytic activity in conversion of exhaust fumes to (a) oxidize carbon monoxide, hydrocarbons and/or hydrocarbon residues or (b) to reduce nitrogen oxides. This may derive from catalysts present in the original components of the tube (i.e., ceramic fibers, ceramic binder or refractory oxide matrix) or by addition of catalysts to the final tube. The catalyst may be placed upon the final tube by adsorption of a suitable compound of the active component or imbibition of an active material or precursor from a slurry form followed by drying and conversion to the active material.

Suitable catalysts include the precious metals (Ru, Rh, Pd, Os, Ir and Pt) in elemental or oxide form and oxides, vanadates, chromates, chromites, manganates, manganites, stannates, molybdates, tungstates, niobates or tantalates of Fe, Co, Ni, Cr, Mn, Cu, Zn, Ag and Cd; and the rare earth salts.

TEST PROCEDURES

Tensile Strength

Tensile strengths of fibers are measured at ambient conditions using a method described by R. D. Schile et al. in "Review of Scientific Instruments" 38, No. 8, Aug. 1967, pp. 1103-4. The gauge length is 0.04 inch and the cross head speed is between 1 and 4 mils/minute.

Compressive Strength

Compressive strength is determined by crushing a a tube along its longitudinal axis between two flat steel plates moving at a rate of 0.10 inch/min. on an Instron instrument. The compressive strength is reported as the breaking force in pounds/square inch (psi) obtained by dividing the breaking force by the cross-sectional area of the tube.

Erosion Resistance

The erosion resistance of a tube is determined by exposing its outside surface to a stream of water, air and abrasive material for one minute. The stream and the axis of the tube are coplanar and the stream forms an angle of 20° to the surface. Erosion is reported as the maximum vertical depth in inches of the eroded area. A "Liquid Honer" machine (Model 2820 made by Vapor Blast Manufacturing Co. of Milwaukee, Wis.) is used. The abrasive slurry consists of 4540 grams of a 1250 grit abrasive (Vapor Blast N.V.B. abrasive) and 454 grams of a dispersing powder (NO-PAK) in sufficient water so that 3 ml. of solids settle in 10 minutes from 10 ml. of the slurry pumped by the machine into a 10 ml. graduate cylinder. Air at 80 psi gausge is fed to a nozzle through a 0.125 inch I.D. tube centered in a 0.5 inch I.D. tube. Abrasive slurry is pumped at the rate of 8 liters per minute through the annulus of the 0.5 inch tube to the nozzle. The end of the nozzle (0.25 inch I.D.) is positioned 0.625 inch from the outside edge of the tube to be tested.

This test roughly simulates, and drastically accelerates, the effect which particulate matter has when it impinges on exhaust system components (e.g., baffles, bends) while traveling at high velocity in an automobile engine exhaust-gas-stream. The number of particles in the liquid used in the test and the velocity of the fluid are chosen to give approximately the same amount of wear in 1 minute as an object in an exhaust-gas-stream would experience if connected to an engine driving a car 60 miles/hr. for 50,000 miles. Erosion of <0.25 inch indicates that erosion resistance will probably be satisfactory for all contemplated end-uses. "Penetration" (that is, complete erosion through the tube wall) does not necessarily indicate probable failure for all end-uses but only those involving the most stringent conditions in the sense of the test. A commercial ceramic honeycomb used as catalyst substrate in automotive emission control devices has a penetration factor of about .016 inch.

Pressure Drop

Pressure drop is a measure of the resistance of the reticulated tube to gas flow through its walls. It is determined by holding the base of the reticulated tube airtight against a flange at the end of a 2 inch inside diameter duct that is designed to approximate laminar flow, sealing the opposite end of the tube, passing ambient air through the duct at 150 cubic feet/minute and measuring the pressure in the duct. This is the pressure drop ($\Delta P$) due to the flow of the air through the walls of the reticulated tube and is expressed in inches of water.

Yarn Sag Temperature

The softening temperature of a yarn is obtained by placing a two-inch length of yarn across the sides of an alumina boat of about one-inch width so that about equal lengths extend beyond both sides, heating the boat and fiber in a furnace and raising the temperature by 50° C. increments until the yarn sags at either end or in the middle.

Creep Failure Temperature

The creep failure is a measure of the high-temperature, load-bearing properties of the structures. The structures are placed upright with a weight equivalent to a force of 4 to 10 pounds/square inch of tube cross-sectional wall area in an oven at about 600° C. The temperature is slowly raised with 0.5 hour holding periods at about 100° C. intervals beyond 1000° C. until the structure obviously bulges, buckles, sags or ruptures. The temperature (° C.) at which this happens is termed the "creep failure temperature".

Porosity Determination

Standard microstructural analysis techniques using optical and/or electron microscopy are used to characterize the porosity (reference *Ceramic Microstructures*, edited by R. M. Fulrath and J. A. Pask, J. Wiley and Sons, Inc., New York, 1968, pp.25-70).

Specimen preparation involves mounting, grinding and polishing of representative samples of interest (details described in above reference pp. 187-206).

Fibers are readily distinguished from the matrix and binder phases since they retain their continuous fibrous shape. The characterization of the matrix is performed to include the pores generated by the evolution of volatiles and the cracks generated due to the shrinkage of the relatively low solids content matrix precursor composition during the firing.

The invention is further illustrated but is not intended to be limited by the following examples in which all percentages are by weight unless otherwise specified.

X. The S glass fibers ("Fiberglas S" made by owens-Corning Fiberglas Corporation of Toledo, Ohio) used in the Examples have a nominal composition of 64–66% $SiO_2$, 24–26% $Al_2O_3$ and 9–11% MgO, a tensile strength of about 650,000 psi at 25° C. and about 350,000 psi at 600° C. and a softening and yarn sag temperature of about 850° C. A 300 denier yarn of S glass fibers contains 204 filaments of about 0.4 mil diameter.

XX. The as-spun alumina refractory oxide precursor fibers as used in Examples 1 - 5 are typically prepared as follows:

Suitable fine particles of α-alumina are made by classifying an aqueous dispersion (adjusted to a pH value of about 4.0 with hydrochloric acid) containing about 20% of finely divided alumina (A-16 SG, about 99.7% $Al_2O_3$, marketed by Aluminum Co. of America) by sedimentation to remove all particles larger than about 2 microns. The dispersion is concentrated to about 60% aluminum oxide. Using the procedure of G. A. Loomis (J. Amer. Ceramic Society 21, 393, 1938) it is determined that about 100% of the particles in a typical classified product exhibit an equivalent spherical diameter (e.s.d.) less than 2 microns and about 89% exhibit a diameter less than 0.5 micron. 100% of the original unclassified alumina has an e.s.d. less than 7.2 microns and 96.8% have an e.s.d. less than 2.2 microns.

A spin mix (spin mix I) is made by adding 350 parts of the above alumina dispersion, 4.40 parts $MgCl_2 \cdot 6H_2O$, 7.90 parts $AlCl_3 \cdot 6H_2O$ and 8.10 parts concentrated hydrochloric acid in 40 parts of water to a jacketed mixing vessel. The mixture is heated to 55° C., held at 55° C. for 30 minutes and 292 parts of aluminum chlorohydroxide $[Al_2(OH)_5Cl \cdot 2H_2O]$ are added. The mixture is held at 55° C., and stirred for about 12-16 hours. Vacuum is applied with stirring to deaerate and remove water until the mixture has a viscosity of about 500 poise (measured at 30° C.). The mix at 30° C. is then transferred to a stirred container for further removal of water under vacuum until the spin mix has a viscosity of about 1400 poise at 30° C. At this point a total of about 30 parts of water has been removed from the original mix.

The spin mix is pumped to a spinning head, through filters and at a temperature of about 38° C. through a spinneret (95 holes of 4 mil diameter and 8 mil length) down into a 5-foot long spinning column. Predried air at a rate of about 3.0 S.C.F.M. is heated and enters the top of the spinning column. The air just below the spinneret is 125°-145° C. The column walls are heated to a temperature of ca. 110° C. The relative humidity at the bottom of the column is maintained at about 20–30%. The 95 filament yarn is attenuated by passing it around two 6-inch diameter rolls - both running at the same surface speed of 500–600 feet per minute, located at the bottom of the column. A spin finish of 20% ethyl laurate and 80% Perclene ® perchloroethylene is applied to the yarn just prior to or after the two rolls. This is an "as-spun refractory oxide precursor fiber" or "as-spun precursor alumina fiber". It contains about 40% volatiles (water and HCl).

XXi. The as-spun fiber described above can then be completely fired. It is wound up under a tension of 5–10 grams on a collapsible bobbin. The bobbin of yarn is placed in a furnace (under 100° C.), fired to 550° C. in 1.5 hours and held at 550° C. for 45 minutes before removing and cooling. This yarn (termed "fired precursor fibers") contains about 8% volatiles. The yarn is unwound from the bobbin, passed through a ring burner at the bottom of a 12-inch high chimney and wound up at about 40 feet/minute as a yarn of refractory oxide fibers (alumina fibers I). The burner is fed with a mixture of propane and oxygen so as to give an apparent (uncorrected for emissivity) yarn temperature of 1450° C. (measured with an optical pyrometer).

These refractory oxide fibers when properly fired have a tensile strength in the range of 100,000 to 250,000 psi (both at 25° and 600° C.) and a diameter of about 0.6 to 1 mil and a yarn sag temperature in excess of 1400° C. They have a porosity of less than about 10%.

XXX. Examples 1-3 illustrate tubes made partially from as-spun refractory oxide precursor fibers. Examples 4 - 5 illustrate tubes made of as-spun refractory oxide precursor fibers. All of the matrices of the examples have a "softening point" about 1000° C.

EXAMPLE 1

This example shows the preparation of a reticulated tube made of a yarn of refractory oxide fibers which are bonded with a high melting amorphous ceramic binder and contained in a refractory oxide matrix.

A. A 95 filament yarn of as-spun precursor alumina fibers (XX), which has about an 1100 denier after firing at 1450° C., is joined with two 300-denier continuous filament yarns of S glass (X) and wound in a criss-cross fashion onto a 12-inch long bobbin at 500 fpm for 14 minutes. A winding angle of 41° and a diagonal A of 0.23 inch are used. The bobbin consists of a collapsible metal tube (of rolled sheet) of 2 inches diameter covered with 2 layers of "Fiberfrax" refractory felt and an outer (0.25 inch) layer of Du Pont Microfoam sheeting. After winding, the metal tube and "Fiberfrax" are removed and replaced with a "Fiberfrax" covered ceramic tube of 1.5 inches diameter for firing. The package is fired for 45 minutes at 550° C., cooled, and then fired at 1350° C. for 45 minutes.

The ceramic tube covered with "Fiberfrax" is removed, leaving a reticulated tube which consists of refractory oxide fibers bonded by glass. This latter tube is coated with a composition consisting of 75 parts of spin mix I (XX) and 25 parts of water. The coated tube is oven dried at 150° C. and fired at 550° C. for 45 minutes. The tube is coated and fired a second time. The tube is then coated with another coating composition consisting of a 30% solids (86.5% $SiO_2$, 13.5% $Al_2O_3$) aqueous dispersion of alumina-coated $SiO_2$ particles (Positive Sol 130 M made by E. I. du Pont de Nemours and Company, Inc. of Delaware) dried and fired at 850° C. for 30 minutes.

The final composition of the recticulated tube is 34% refractory oxide fibers, 19% glass binder, 38% refractory oxide matrix from the diluted spin mix I (XX) and 9% refractory oxide matrix from the alumina-$SiO_2$ dispersion. The ends of the tube are cut off leaving a 10.5 inch length weighing 581 grams.

Properties are given in Table I.

B. A reticulated tube is made as described in A above having a composition of 33% refractory oxide fibers, 18% glass binder and 49% total refractory oxide matrix from diluted spin mix I (XX) (39.6%) and from alumina-silica dispersion (9%). The tube is 6.75 inches long, weighs 405 grams, and has an inside diameter (I.D.) of 2.25 inches and a wall thickness of 0.425 inch. Its ends (0.75 inch) are coated with a commercial high temperature bonding and coating cement ("Cera-Kote" cement made by Johns Manville Co. of Denver, Colorado) and dried at 150° C. The tube is soaked in platinum resinate solution No. A-1121, 12% Pt (made by Engelhard Industries) and fired at 400° C. for 30 minutes to leave a final platinum coating of 1.25 grams.

The reticulated tube is then placed in a reactor as shown in FIG. 4 which is fitted into the air pump assisted exhaust system of a 1972 Oldsmobile. It converts 95% of the CO and 81% of the hydrocarbons in the exhaust when the engine is run on a Dynamometer at a rate equivalent to 20 miles/hour on a road.

The tube retains its integrity and strength for 50,000 miles of road driving.

Similar results are obtained using the above general procedure with the following coating compositions:

C. 167 g. sodium silicate solution (40°–42° Be)
667 g. unclassified alumina used for spin mix I (XX)
1167 g. water and ball-milled about 16 hours. This composition fired at 850° C. provides a matrix having a porosity of 28.0%.

D. 500 g. alumina hydrate, 1 $\mu$ (RH730 by Reynolds Metal Co.)
1500 g. of a 50% aqueous solution of $Al_2(OH)_5Cl\cdot2.2H_2O$
210 g. of water E. A product similar to that in A above is made using alumina fibers completely fired (XXi) and S glass fibers (X) (as a binder) wound around the bobbin with a winding angle of 28° and a diagonal A of 0.23 inch. The coating composition of Example 4 is used. The final fired reticulated tube contains 40% alumina fibers, 34% glass and 26% refractory oxide matrix.

EXAMPLE 2

A. A 95 filament yarn of as-spun precursor alumina fibers (XX) having a denier of 2280 after firing, is joined with 1200 denier yarn of continuous S glass binder fibers (X) and wound in a criss-cross fashion onto a bobbin using a winding angle of 37° and a diagonal A of 0.12 inches. The bobbin consists of a stainless steel tube of 1.75 inch O.D. covered with a 0.25-inch layer of a combustible foam (Du Pont Microfoam Sheeting). The wound bobbin is fired at 550° C. for 45 minutes, cooled and then placed in an oven preheated to 1250° C. and fired at 1250° C. for 45 minutes.

The bobbin is removed and the cold tube of bonded fibers is immersed in a coating composition similar to the diluted spin mix I (XX) as described in Example 1A, drained, dried at 150° C. and then fired at 550° C. for 45 minutes.

B. A product of A above is given an additional coating of the coating composition, drained, dried and fired at 850° C. for 45 minutes. The product has a creep deformation temperature of 1450° C. at 4 psi load.

Properties are given in Table I.

C. Satisfactory products are also made using the procedure of B above with a 95 filament yarn of precursor alumina fibers (XX) (2680 denier after firing) and a 900 denier yarn of S glass (binder) fibers (X). The final product contains 47% alumina fibers, 16% binder and 37% of an alumina refractory oxide matrix. It has a $\Delta P$ of 9 inches of water and the matrix has a porosity of 25.8%.

EXAMPLE 3

A. The procedure of Example 2 is followed using a 95 filament yarn of alumina precursor fibers (XX) having a denier of 1150 after firing, and a 600 denier yarn of S glass binder fibers (X) with a wind angle of 37° and a diagonal A of 0.12 inches. After firing at 1250° C., the tube is given 2 applications of a coating composition similar to that of Example 2 and is dried and fired at 550° C. for 45 minutes between coats with a final firing at 850° C. for about 45 minutes. The final tube contains 22% and 17% refractory oxide matrix derived from the first and second coatings, respectively, and has a creep deformation temperature of 1450° C. at 4 psi load.

B. A second sample is made as above, except that three applications of coating composition are used yielding, in the final tube, 18.7%, 13.9% and 14.6% of refractory oxide matrix, respectively in order.

EXAMPLE 4

This example shows the preparation of a reticulated tube of refractory oxide fibers in a ceramic matrix.

A. A 95 filament yarn of as-spun precursor alumina fibers (XX) is wound criss-cross on a bobbin of the type in Example 1 at 500 fpm for 20 minutes using a winding angle of 36° and a diagonal A of 0.15 inch. The tube of yarn is fired first at 550° for 45 min. and then at 1350° C. for 45 mins. to yield a reticulated tube of alumina fibers.

The tube is quite flexible and loose in the absence of bonding, so it is kept on the metal bobbin while a first thin coating of a refractory oxide matrix forming coating composition is applied and fired. The tube is then removed from the bobbin.

The coating composition (22% $Al_2O_3$ after full firing) is made of 10.1 parts "Alon" C alumina (about 100% gamma-alumina with a particle size of 0.01 to 0.04 $\mu$ made by Cabot Corporation), 59.6 parts water, 0.2 part $MgCl_2\cdot6H_2O$, 3.0 parts $AlCl_3\cdot6H_2O$, 24.4 parts $Al_2(OH)_5Cl\cdot2.2H_2O$ (Chlorhydrol), 2.4 parts of a 10% aqueous solution of a polyethylene oxide (Polyox 205 by Union Carbide) and 0.3 part concentrated hydrochloric acid. This composition fired at 850° C. provides a matrix having a porosity of 36.8%.

The first coating is fired at 150°–550° C. for 45–120 min. to drive off volatiles and prevent dissolution of the coating in subsequent coating applications. After this first firing, the tube is removed from the bobbin and a second application of coating is made in a manner similar to the first. After the second firing, a final coating is applied and is fired at 750° C. for 30 mins. A 6.75 inch length cut from the center of the tube weighs 238 g.

Properties are given in Table I.

B. A reticulated tube is made ($\theta$, 36°; diagonal A, 0.11 inches) as in A having an I.D. of about 3 inches, a wall thickness of about 0.35 inch and weighing 277 grams for the 5.81 inch length cut from the center.

The ends of the tube are protected with "Cera-Kote" cement and about 1 g. of platinum is applied. The tube is spring mounted in a cannister similar to that shown in FIG. 4 and connected to the exhaust system of a 350 cubic inch Chevrolet V-8 engine on a stand. The engine is rigged so that a bank of 4 cylinders is operated for 15 minutes, shut off and the other bank started. This results in the exhaust gas temperature varying from 230° F. to 1180° F. every 15 minutes. The engine is operated under these conditions for 393 hours, then for 107 hours cycling from 210° F. to 1340° F. The reticulated tube retains its integrity during this operation.

EXAMPLE 5

A 95 filament yarn of as-spun precursor alumina fibers (XX) with a fired denier of 1100 is wound criss-cross on a 2 inch O.D. steel tube covered with combustible foam, using a wind angle of 39° and a diagonal A of 0.23 inches. The wound tube is fired at 550° C. for 45 minutes. The tube of alumina fibers is coated with a diluted spin mix similar to spin mix I (X), dried and the steel tube removed. The dried tube of coated alumina fibers is first fired at 550° C. for about 45 minutes and then at 1300° C. for about 45 minutes and cooled. The tube is given a second application of the diluted spin mix I (X), drained, dried and fired at 850° C. for about 45 minutes. Diluted Spin mix I when fired at 850° C. provides a matrix having a porosity of 26.5%. The final tube of $\alpha$ alumina fibers in an alumina matrix has a length of 5.88 inches and weighs 540 grams. A sample made similarly had a creep deformation temperature of 1450° C. at 4 psi load. Other properties are given in Table I.

EXAMPLE 6

This example shows the preparation of a reticulated tube having a high melting glass fiber as the ceramic fiber, and having a refractory oxide matrix.

A. Twelve ends of yarn of continuous filament "S" glass are plied and twisted to give a total yarn denier of about 3600. This yarn is dipped into a coating composition, and the coated yarn wound on a 2-inch O.D. mandrel in a cross-cross fashion using a wind angle of 30° and a diagonal A of 0.23 inch and dried at room temperature overnight. The mandrel is removed and the tube fired at 900° C. for 30 minutes.

The coating composition employed contains 25 parts water glass solution of 40°-42° Be (about 40% solids), 100 parts of water and 100 parts of the alumina used for spin mix I (XX) before classifying.

The 6.5 inch tube weighs 215 grams.

Properties are given in Table I.

B. A reticulated tube, made in a similar procedure to A above and having approximately the same composition, is mounted in a cannister and run on the engine stand as in Example 4B. It survives 264 hours of cycling from 250° to 1150° F., 236 hours of 250° to 1350° F., 40 hours at 1500° F. steady and 47 hours cycling from 250° to 1500° F.

EXAMPLE 7

A 3600 denier yarn with 1.5S turns/inch of continuous S-glass fibers (X) having a diameter of 11-12 microns is impregnated with a coating composition by passing the yarn over a finish roll containing the composition. The yarn is then wound helically on a core in a criss-cross fashion using a wind angle of 26° and a diagonal A of 0.14 inch. The core with a diameter of about 1.8 inches consists of a stainless steel tube covered with a layer of a paper towel and an overlapping layer of heavy aluminum foil. The tube of yarn with aluminum liner is removed from the steel tube and dried at 150° C. The coating composition is made by mixing 9830 g of the unclassified alumina of spin mix I (X),
4494 g of a 50% aqueous solution of $Al_2(OH)_5Cl \cdot 2H_2O$, 2775 ml of water,
79 ml of concentrated HCl and ball milling the mixture overnight.

Dried tubes (A), with the aluminum liner removed, are placed in a cold oven and heated to 900° C. in about two hours, held at 900° C. for about one hour and removed.

Other dried tubes (B) are heated from room temperature to 1000° C. over a period of 2-3 hours and held at 1000° C. for about one hour and cooled.

Still other dried tubes (C) are heated from room temperature to 1100° C. in about three hours and held at 1100° C. for about one hour and cooled.

The final tubes have a length of about 5.8 inches and weights of 489, 505 and 509 g, respectively, for A, B and C.

Properties are given in Table I.

The fibers in the structures are present as predominantly separate fibers. The fibers of Sample A are still glass fibers since the only crystalline phase present (from X-ray) is $\alpha$-alumina. None of the samples contain any cristobalite. Samples B and C show the presence of $\mu$-cordierite, a meta-stable phase. All samples have a $\Delta P$ of between 1 and 20 inches of water.

Tubes are wound as above using a wind angle of 29° and a diagonal A of 0.12 inches.

A coating composition is prepared by mixing the following ingredients in the order given:

360 parts of a 50% aqueous solution of $Al_2OH_5Cl \cdot 2H_2O$,
275 parts of Mg $Cl_2 \cdot 6H_2O$,
11.0 parts of concentrated hydrochloric acid (ca. 37% HCl) and
130.0 parts of alpha alumina particles with a median particle size of about 0.5 micron.

The mixture is stirred for 6 to 12 hours to dissolve the soluble ingredients and then treated for 4 hours in a Sweco Vibro-Energy Wet Grinding Mill (model M45L by Sweco Co., Los Angeles, Cal.) to obtain a good dispersion and break up aggregates of alumina (98% of particles no larger than 2 microns). This dispersion, with a viscosity of about 120 centipoises at 30° C., is diluted with a small amount of water to a viscosity of 60 centipoises at ca. 26° C.

The tubes are dried, heated to 600° C., held at 600° C. for 45 minutes and cooled. The cool tubes are dipped into a bath of the above coating composition and dried. The tubes are then placed in a cold oven which is heated to the maximum temperature specified below, held at that temperature for 30 minutes and cooled. The total amount of refractory oxide matrix and that portion derived from prewinding (a) and postwinding (b) application of the coating composition is given below.

| Item | Refractory oxide matrix, % a | b | Total | Maximum Temp. ° C. |
|---|---|---|---|---|
| D | 25 | 12 | 37 | 900 |
| E | 20 | 9 | 29 | 1000 |
| F | 24 | 12 | 36 | 1100 |

Items D, E and F all have a creep failure temperature of 1300° C. at a load of 4 psi, compressive strengths of at least 30 psi, $\Delta P$ values of from 1-40 inches and contain less than 5% cristobalite. The tubes all have lengths of about 6 inches and an inside diameter of 1.8 inches. Tubes D, E and F have wall thicknesses of 0.60, 0.57 and 0.56 inches respectively and weigh 430, 385 and 428 grams.

TABLE I

| Example | Composition F/B/M* | Tube I.D. (.in.) | Wall thick (in.) | Compressive Strength (psi) | $\Delta P$ inches of water | Erosion inches |
|---|---|---|---|---|---|---|
| 1A | 34-19-47 | ca. 2.6 | 0.42 | 118 | 2 | 0.13 |
| 1C | 38-35-27 | 2.97 | 0.54 | 62 | 7.5 | 0.04 |
| 1D | 40-39-21 | 2.77 | 0.60 | 50 | 6 | 0.23 |
| 1E | 40-34-26 | 2.66 | 0.47 | 80 | | 0.13 |
| 2A | 52-28-20 | 1.95 | 0.56 | 85 | 18 | |
| 2B | 44-23-33 | 1.95 | 0.58 | 196 | 7 | |
| 3A | 39-22-39 | 1.87 | 0.49 | 182 | 13 | 0.24 |

TABLE I-continued

| Example | Composition F/B/M* | Tube I.D. (.in.) | Wall thick (in.) | Compressive Strength (psi) | Δ P inches of water | Erosion inches |
|---------|--------------------|------------------|------------------|----------------------------|---------------------|----------------|
| 3B | 34-19-47 | 1.85 | 0.53 | 612 | 23 | 0.04 |
| 4A | 66-0-34 | 2.58 | 0.34 | 35 | 6 | penetrated |
| 5 | 51-0-49 | 2.1 | 0.60 | 208 | 2 | |
| 6A | 60-0-40 | 2.0 | 0.31 | 74 | <1 | penetrated |
| 7A | 54-0-46 | 1.8 | 0.54 | 326 | 1-20 | |
| 7B | 53-0-47 | 1.8 | 0.59 | 440 | 1-20 | |
| 7C | 52-0-48 | 1.8 | 0.56 | 393 | 1-20 | |

*Fiber/Binder/Matrix

Although the invention has been described in considerable detail in the foregoing, it is to be understood that such detail is solely for the purpose of illustration and that variations can be made therein by those skilled in the art without departing from the spirit and scope of the invention.

The embodiments of the invention in which an exclusive property or privilege is claimed are defined as follows:

1. A process for the preparation of a fiber-reinforced ceramic tube with fluid permeable walls comprising the steps of
   A. plying separate yarns of
      1. a refractory oxide fiber having a softening point above about 750° C. or a fiber of a precursor of the refractory oxide and
      2. a ceramic binder fiber having a softening point above about 750° C. but at least 50° C. lower than the yarn sag temperature of refractory oxide fiber
   B. winding the plied yarn on a tubular core in multiple layers of spaced helical coils in a criss-cross fashion to form a tube of yarn having a multitude of channels of quadrilateral-shaped cross-sections extending through the walls of the tube of yarn,
   C. firing the tube of yarn for a time and temperature sufficient to
      1. convert any precursor fibers present to refractory oxide fibers and
      2. soften the ceramic binder fiber to such an extent that it at least partially flows around the refractory oxide fibers to bind adjacent fibers upon cooling, and
   D. placing a coating composition on the bonded structure and firing to form a refractory oxide matrix at least partially surrounding said fibers but not closing said channels and to provide said tube with a compressive strength of at least 30 psi.

2. The process of claim 1 wherein the coating composition contains 60–90% by weight of particles of a refractory oxide and 10–40% by weight of particles of a refractory oxide precursor.

3. The process of claim 1 wherein the ceramic binder fiber has a maximum softening point of about 1300° C.

4. The process of claim 1 wherein the plied yarns are wound at winding angles of 3° to 52°.

5. The process of claim 1 wherein said refractory oxide fibers contain at least 70% by weight $Al_2O_3$.

6. The process of claim 1 wherein said firing converts said ceramic binder fiber to fused glass which constitutes 15 to 40% by weight of said tube, and said refractory oxide matrix constitute 15 to 60% by weight of said tube.

* * * * *

UNITED STATES PATENT OFFICE
CERTIFICATE OF CORRECTION

PATENT NO. : 4,092,194
DATED : May 30, 1978
INVENTOR(S) : James R. Green

It is certified that error appears in the above-identified patent and that said Letters Patent are hereby corrected as shown below:

Column 1, line 30, "theremal" should read -- thermal --.

Column 9, line 46, "gausge" should read -- gauge --.

Column 10, line 58, "owens" should read -- Owens --.

Column 12, line 5, "about" should read -- above --.

Column 12, line 40, "recticulated" should read -- reticulated --.

Column 15, line 13, "cross-cross" should read -- criss-cross --.

Column 15, line 13, "30°" should read -- 39° --.

Signed and Sealed this

Seventh Day of November 1978

[SEAL]

Attest:

RUTH C. MASON
*Attesting Officer*

DONALD W. BANNER
*Commissioner of Patents and Trademarks*